United States Patent
Hsu et al.

(10) Patent No.: US 8,843,361 B1
(45) Date of Patent: Sep. 23, 2014

(54) METHOD AND APPARATUS FOR AUTOMATIC DETECTION AND VISUALIZATION OF CHANGES WITHIN LARGE STREAMS OF TEXT

(75) Inventors: Wen-Ling Hsu, Bridgewater, NJ (US); John Grothendieck, Highland Park, NJ (US); Guy J. Jacobson, Bridgewater, NJ (US); Jeremy Huntley Greet Wright, Berkeley Heights, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 1561 days.

(21) Appl. No.: 11/290,758

(22) Filed: Nov. 30, 2005

(51) Int. Cl.
*G06F 17/27* (2006.01)
*G06F 7/00* (2006.01)

(52) U.S. Cl.
USPC .............................................. 704/9; 707/695

(58) Field of Classification Search
USPC ................................ 704/9; 707/695; 715/229
See application file for complete search history.

(56) References Cited

U.S. PATENT DOCUMENTS

| | | | |
|---|---|---|---|
| 7,174,377 B2 * | 2/2007 | Bernard et al. | 709/224 |
| 7,194,483 B1 * | 3/2007 | Mohan et al. | 707/600 |
| 2002/0087603 A1 * | 7/2002 | Bergman et al. | 707/517 |
| 2005/0206957 A1 * | 9/2005 | Chia et al. | 358/1.18 |
| 2006/0085738 A1 * | 4/2006 | Chapus et al. | 715/513 |
| 2006/0136510 A1 * | 6/2006 | Voronov et al. | 707/203 |

OTHER PUBLICATIONS

Biemann et al (Disentangling from Babylonian Confusion—Unsupervised Language Identification (2005); Book Chapter in Computational Linguistics and Intelligent Text Processing; pp. 773-784).*

* cited by examiner

*Primary Examiner* — Angela A Armstrong

(57) ABSTRACT

A method, an apparatus, and a computer-readable medium are provided. Whether at least one significant change occurs in a use of at least one word of a group of text documents of a text corpus is determined. A display based, at least in part, on at least one change point corresponding to the at least one significant change is presented when the at least one significant change is determined to have occurred.

22 Claims, 7 Drawing Sheets

|  | SCORE | FILE NAMES |
|---|---|---|
| FELL | 3.5 | JAN-15, JAN-16, JAN-17, JAN-18 |
| ICE | 3.3 | JAN-16, JAN-18 |
| ANKLE | 2.4 | JAN-15, JAN-17, JAN-20 |
| WRIST | 2.3 | JAN-16, JAN-17, JAN-20, JAN-21 |

| WORD | % OF DOCUMENTS WITH WORD |
|---|---|
| CERTIFICATE | 77.94% |
| REGISTRATION | 58.33% |
| 20 | 55.39% |
| GIFT | 53.92% |
| RECEIVE | 50% |
| THANK | 46.08% |
| UP | 40.20% |
| SIGN | 37.75% |
| WHEN | 36.76% |
| HOW | 35.78% |

*FIG. 7*

| word groups | % of documents with co-occurrence of words |
|---|---:|
| gift certificate | 47.55% |
| sign up | 37.25% |
| online billing | 25.98% |
| 20 register | 23.53% |
| receive 20 | 20.10% |
| up online | 20.10% |
| new certificate | 17.65% |
| register | 14.71% |
| when receive | 13.73% |
| 20 gift | 13.24% |

METHOD AND APPARATUS FOR AUTOMATIC DETECTION AND VISUALIZATION OF CHANGES WITHIN LARGE STREAMS OF TEXT

BACKGROUND OF THE INVENTION

1. Field of the Invention

The present invention relates to determining changes in an amount of word use over time for words within text documents and to summarizing text documents having at least some of the changes. More specifically, embodiments of the invention relate to an apparatus and method for determining changes in an amount of word use for words within text documents, determining a time frame when the changes in the amount of word use occurred, presenting information with respect to the changed amount of word use and presenting a visual graph summarizing at least portions of the text documents including words determined to have the changed amount of use.

2. Introduction

Companies often collect a large corpus of unstructured text data continuously over time. The unstructured text data may be, for example, e-mail messages, transcriptions of customer comments, transcriptions of phone conversations, physical mail, medical records, news feeds, blogs, or the like. Each item of data may be generated or collected at a particular point in time. Managers may wish to learn about the contents of the data and the changes that occur over time, including when and why, such that they may understand and/or act upon the information contained within the data. Because of the large volume of data, it is too expensive and difficult to individually read each document in the corpus, determine the changes and summarize the contents of the data. Further, the data's lack of structure makes conventional tools insufficient to facilitate the understanding of the contents of the data, such as, for example, conventional statistical analysis tools.

Existing tools that perform automatic summarization of textual data typically provide textual output only. While some tools provide visual graphics with respect to word frequencies, they do not provide any other visually graphic information.

Thus, there is a need for a tool that facilitates the understanding of changes in a large volume unstructured text corpus and that takes advantage of human cognitive visualization capability.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a method of text mining is provided. Whether at least one significant change occurs in a use of at least one word of a group of text documents of a text corpus is determined. A display based, at least in part, on at least one change point corresponding to the at least one significant change is presented when the at least one significant change is determined to have occurred.

In a second aspect of the invention, a machine-readable medium is provided that has instructions for at least one processor recorded thereon. The machine-readable medium includes instructions for determining whether at least one significant change occurs in a use of at least one word of a group of text documents of a text corpus, and instructions for presenting a display which is based, at least in part, on at least one change point corresponding to the at least one significant change when the at least one significant change is determined to have occurred.

In a third aspect of the invention, an apparatus is provided. The apparatus includes at least one processor, a memory and an output device. The at least one processor is configured to determine whether at least one significant change occurs in a use of at least one word of a group of text documents of a text corpus, and present a display which is based, at least in part, on at least one change point corresponding to the at least one significant change when the at least one significant change is determined to have occurred.

In a fourth aspect of the invention, an apparatus is provided. The apparatus includes means for determining whether at least one significant change occurs in a use of at least one word of a group of text documents of a text corpus, and means for presenting a display which is based, at least in part, on at least one change point corresponding to the at least one significant change when the at least one significant change is determined to have occurred.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 7 is an exemplary display of words and related statistical information that may be displayed based on interactions with a graphical view; and FIG. 8 is an exemplary display of groups of words and related statistical information that may be displayed based on interactions with a graphical view.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Introduction

Many companies maintain a massive database of a large number of text files such as customer feedback information. Managers may wish to review the data for a variety of reasons such as, for example, to identify the causes of problems, to identify opportunities for improvement, or to obtain ideas for new products. Implementations consistent with the principles of the invention may determine words having a changed frequency of use, may present information with respect to the words and may create a visual graph summary of the database of text files in an intuitive, easy-to-read graphical form. Various implementations may present a graphical representation of words appearing in the large text files and relationships among the words. In some implementations consistent with the principles of the invention, a relative ranking of a word or groups of words, based on computed scores may be indicated by using visual techniques, such as, for example, using particular colors, line thickness of lines in portions of the presented graphical representation, size of displayed objects, or typography (font, boldness, slant). An interactive capability may be provided to permit a user to select one or more potions of the graphical representation to cause a display of detailed data to be presented. The user may continue to make selections on the display to obtain more detailed information including a listing of contents of one or more test documents.

Exemplary System

Figure 1:
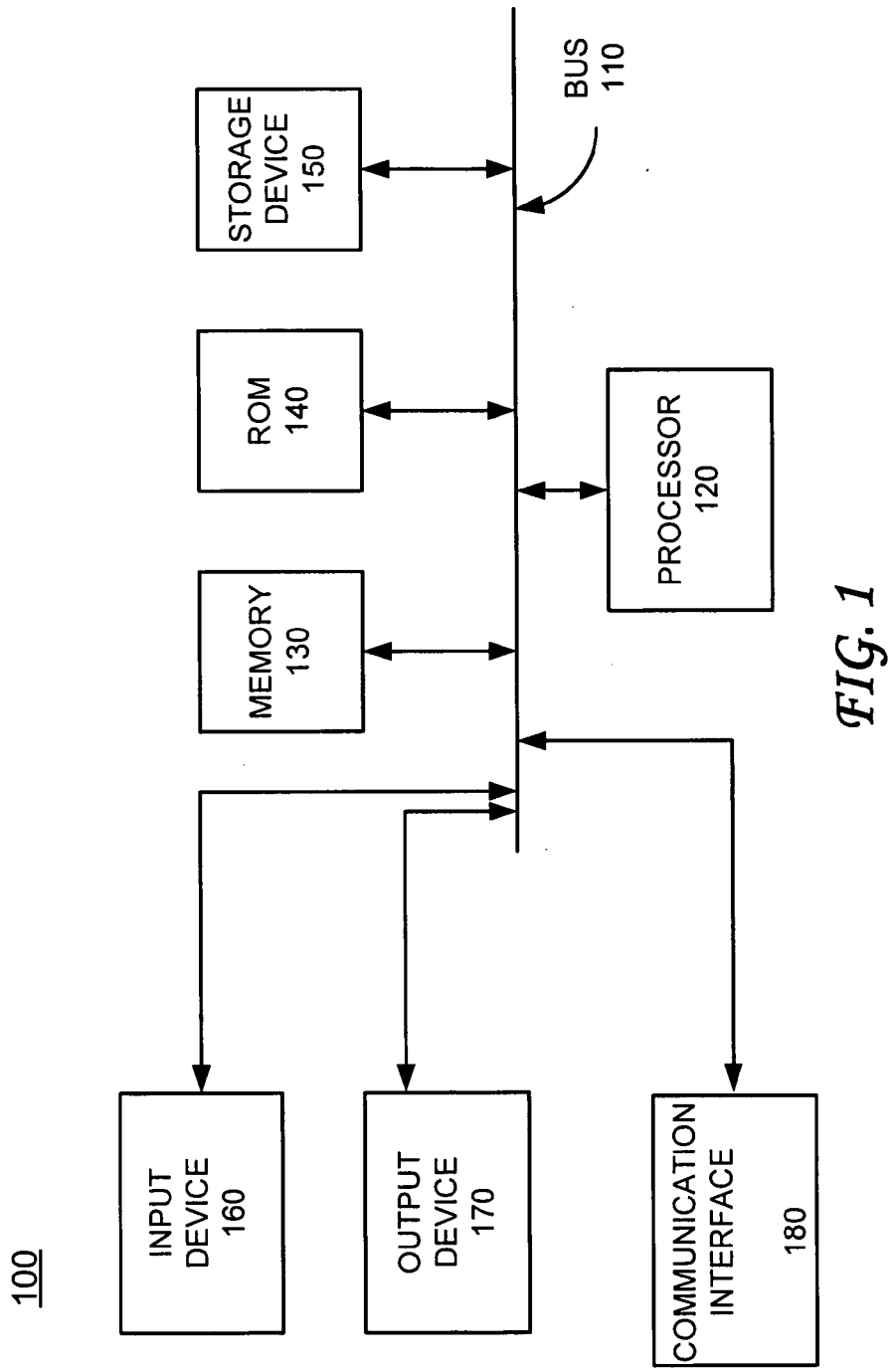
FIG. 1 illustrates an exemplary system in which implementations consistent with the principles of the invention may operate.

FIG. 1 illustrates a block diagram of an exemplary processing device 100 which may be used to implement systems and methods consistent with the principles of the invention. Processing device 100 may include a bus 110, a processor 120, a memory 130, a read only memory (ROM) 140, a storage device 150, an input device 160, an output device 170, and a communication interface 180. Bus 110 may permit communication among the components of processing device 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of media, such as, for example, magnetic or optical recording media and its corresponding drive. In some implementations consistent with the principles of the invention, storage device 150 may store and retrieve data according to a database management system.

Input device 160 may include one or more conventional mechanisms that permit a user to input information to system 200, such as a keyboard, a mouse, a pen, a voice recognition device, a microphone, a headset, etc. Output device 170 may include one or more conventional mechanisms that output information to the user, including a display, a printer, one or more speakers, a headset, or a medium, such as a memory, or a magnetic or optical disk and a corresponding disk drive. Communication interface 180 may include any transceiver-like mechanism that enables processing device 100 to communicate via a network. For example, communication interface 180 may include a modem, or an Ethernet interface for communicating via a local area network (LAN). Alternatively, communication interface 180 may include other mechanisms for communicating with other devices and/or systems via wired, wireless or optical connections.

Processing device 100 may perform such functions in response to processor 120 executing sequences of instructions contained in a computer-readable medium, such as, for example, memory 130, a magnetic disk, or an optical disk. Such instructions may be read into memory 130 from another computer-readable medium, such as storage device 150, or from a separate device via communication interface 180.

Processing device 100 may be, for example, a personal computer (PC), or any other type of processing device. In alternative implementations, such as, for example, a distributed processing implementation, a group of processing devices 100 may communicate with one another via a network such that various processors may perform operations pertaining to different aspects of the particular implementation.

Exemplary Functional Components

Figure 2:
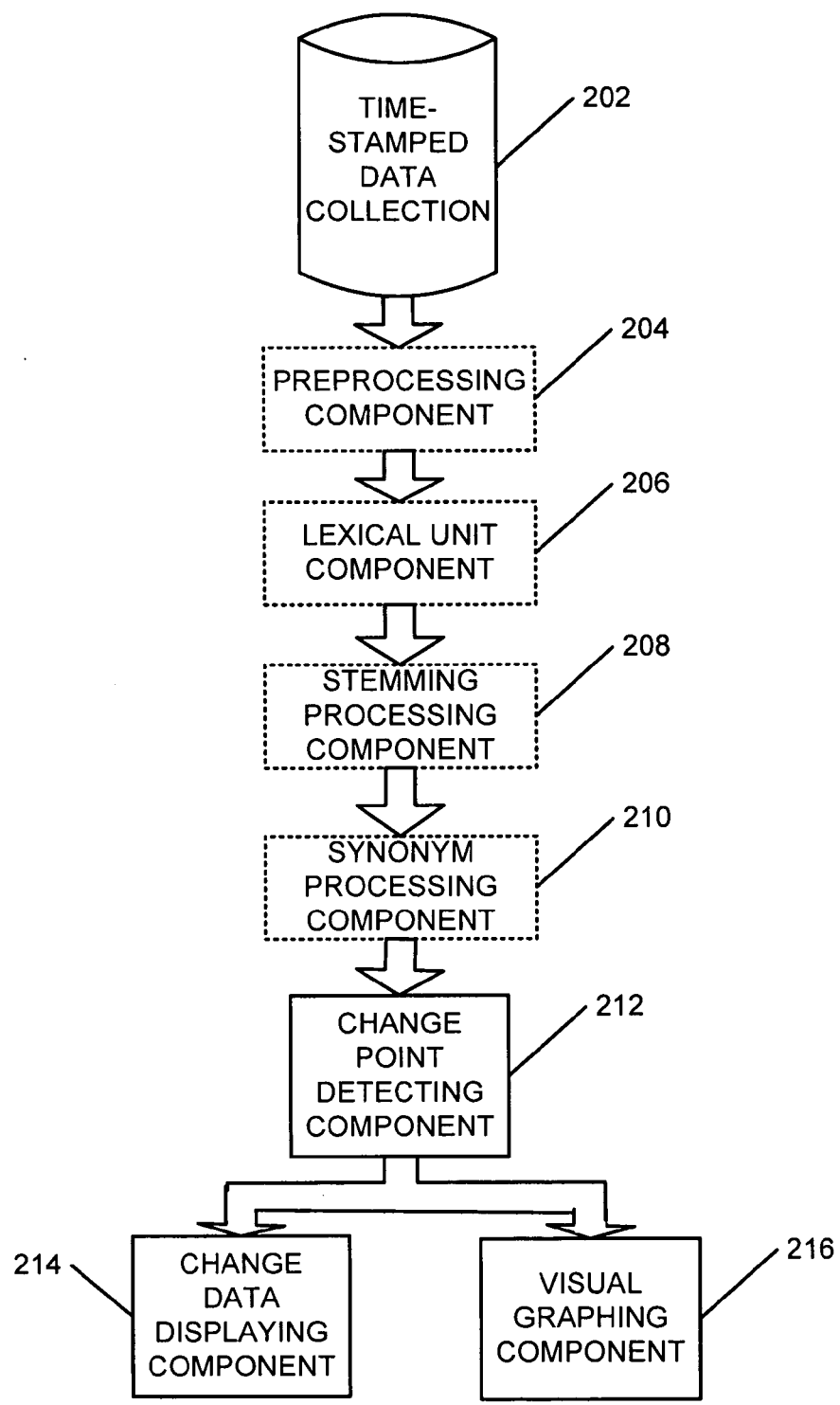
FIG. 2 is an exemplary functional block diagram that helps illustrate different aspects of implementations consistent with the principles of the invention.

FIG. 2 illustrates an exemplary functional block diagram of implementations consistent with the principles of the invention. The functional blocks may include a time-stamped data collection 202, a preprocessing component 204, a lexical unit component 206, a stemming processing component 208, a synonym processing component 210, a change point detecting component 212, a change data displaying component 214, and a visual graphing component 216.

Time-stamped data collection 202 may be a text corpus including a number of text files collected over time. Time-stamped data collection 202 may include time stamps indicating when the text in each file was collected. The time stamps may be on a per word basis. Typically, time-stamped data collection 202 will include a large number of text files with each of the text files including a small number of words. Although, text files included within time-stamped data collection 202 may be large in size. Words within the text files may be viewed as a stream of words with arrival times (time stamps). The arrival times may be assumed to suggest a non-homogeneous Poisson process. Implementations consistent with the principles of the invention may assume that particular words arrive at times consistent with a piecewise-constant Poisson process.

Optional preprocessing component 204 may preprocess text files such that abbreviations may be mapped to a standard form. That is, abbreviations may be mapped to a word or a phrase. For example, "cust" may be mapped to "customer", "advsd" may be mapped to "advised", "educ" may be mapped to "educate", etc. Further, preprocessing component 204 may map commonly misspelled or mistyped words to their proper spelling. For example, "teh" may be mapped to "the", "occurance" may be mapped to "occurrence", etc.

Implementations consistent with the principles of the invention may include a stop word capability. That is, certain high-frequency commonly-used words may be excluded from the analysis. For example, words such as "the", "an", "a", "I", "and", etc. may be excluded from the analysis. The stop word capability may be implemented within optional preprocessing component 204 and may effectively delete stop words from the text to be processed. In other implementations, the stop word capability may be implemented in another component and may be performed at a different point within the processing. For example, the stop word capability may be implemented within lexical unit component 206, stemming processing component 210, change point detecting component 212, or in a new or other component.

Optional lexical unit component 206 may determine whether text in the text files includes any meaningful lexical units and may cause the determined lexical units to be treated as a single word. For example, "United States" may be recognized and subsequently treated as a single word. In one implementation, this may be accomplished by mapping the lexical unit by inserting an unprintable code between words of the lexical unit, such that the lexical unit appears as a single word during later processing. Other methods may also be used.

Optional stemming process component 210 may extract a root or stem of each word and may map each word to its root or stem. For example, the word "refunded" may be mapped to its root "refund", such that occurrences of "refunded" are treated as occurrences of "refund".

Optional synonym processing component 208 may map words to a respective synonym. For example, the word "cost" may be mapped to or grouped with its synonym "price", such that "cost" and "price" may be treated as the same word.

In implementations consistent with the principles of the invention, a software tool, WordNet®, which is available from the Princeton University Cognitive Science Lab, may be used as stemming processor 208 and synonym processor 210 to perform stemming and grouping of synonyms. In other implementations, other domain-specific synonym processors may be employed as synonym processor 210.

Change point detecting component may analyze a group of text files, which may have previously been processed by preprocessing component 204, lexical unit component 206, stemming processing component 208, and synonym processing component 210, in order to determine words with a significant change in an amount of occurrences in the text files, a time frame when the significant changes occurred, in which files the words having significant changes occur, and a magnitude of the changes or score.

Change data displaying component 214 may display information about the detected changes. In one implementation, the display may include a list of words having detected changes, corresponding magnitudes of the changes, and files having the corresponding changed words.

Visual graphing component 216 may display a graph including nodes and edges. Nodes may include one or more words and an edge may indicate a relationship between two of the nodes. The graph may be arranged such that a minimum of edges cross one another, edges are straight as much as possible, closely related nodes as close to one another, and the layout is symmetric. U.S. patent application Ser. No. 11/290,864, filed on Nov. 30, 2005, assigned to the same party as the present application, and entitled "METHOD AND APPARATUS FOR LARGE VOLUME TEXT SUMMARY AND VISUALIZATION", discloses a method and apparatus for displaying nodes and edges depicting words and relationships among words. The application Ser. No. 11/290,864 is herein incorporated herein by reference in its entirety.

Exemplary Change Point Processing

Figure 3:
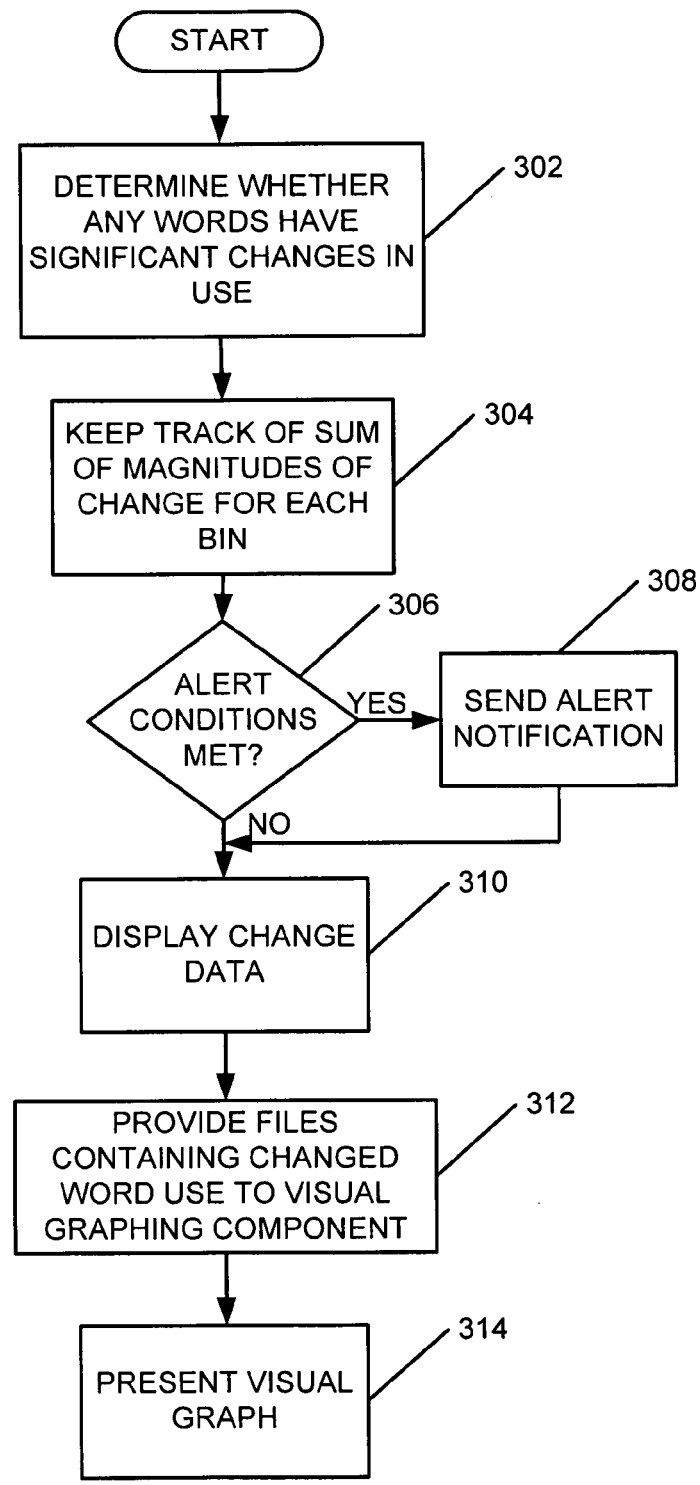
FIG. 3 is a flowchart that illustrates an exemplary process that may be employed in implementations consistent with the principles of the invention.

FIG. 3 is a flowchart illustrating exemplary processing that may be performed in implementations consistent with the principles of the invention. Implementations consistent with the principles of the invention may examine a portion of text in a text corpus, which may be divided into groups of words in bins according to a time-stamp associated with each word. A bin may hold a predetermined number of words received over a time frame. Alternatively, a bin may hold all words received over a particular time frame, such as, for example, one day, one week, or any other suitable time frame. Each bin may hold the same number of words or may hold all words received over the same time frame (i.e., one day, one week, etc.). In some implementations, bins may be of varying size or may hold words received over different size time frames The exemplary process of FIG. 3 may begin with change point detecting component 212 determining whether any words have a significant change in use (act 302). In some implementations, change detection may be performed one word at a time for all bins using a dynamic programming procedure to determine the bins (if any) at which a significant change in a Poisson occurrence rate of a word may be said to occur. In other implementations, change detection may be performed sequentially through the bins, for all words simultaneously. For example, word use in a bin may be compared to a number of previous bins, such as the four previously received bins, or any other suitable number of previously received bins. Change in use of a word may be determined based on relative frequency of occurrence of the word with respect to frequency of occurrence of other words. A significant change may have an associated magnitude of change that exceeds a configurable or predetermined threshold. As an example, the word "refund" may have a significant change in amount of use over a number of previously received bins. The magnitude of the change may be determined by computing an absolute value of a difference between an average frequency of occurrence of the word "refund" over the previous number of bins and a computed frequency of occurrence of the word "refund" in a current bin. In some implementations, the magnitude of the change may be computed as the absolute value of a difference between an average frequency of occurrences of a particular word over the previous number of bins and a computed frequency of occurrence of the particular word in the current bin multiplied by a weight assigned to the word. Thus, words that are considered important may have higher assigned weights, while less important words may have lower assigned weights. In alternative implementations, other methods of calculating the magnitude of change and/or assigning weights to words may be employed. For example, more important words may be assigned lower weights and less important words may be assigned higher weights. Next, change point detecting component 212 may keep track of a sum of the magnitudes of change per bin (act 304).

Change point detecting component 212 may optionally determine whether any alert conditions have been met (act 306). An alert condition is a predetermined conditioned, such as, for example, a sum of magnitudes of change for a bin exceeding a predefined limit, a magnitude of change for any one word exceeding a predefined limit, or a magnitude of change for any one word of a group of particular words exceeding a particular limit. The above alert conditions are only exemplary. Other types of alert conditions may be defined in implementations consistent with the principles of the invention. When change point detecting component 212 determines that an alert condition has been met, then change point detecting component 212 may send an alert notification to a predefined destination (act 308). The notification may be, for example, an e-mail message or other type of message that may include information identifying the alert condition. The notification may also include other useful information, such as, for example, a link to a web page or an analysis tool that can be used to provide other useful information.

Figures 4, 5:
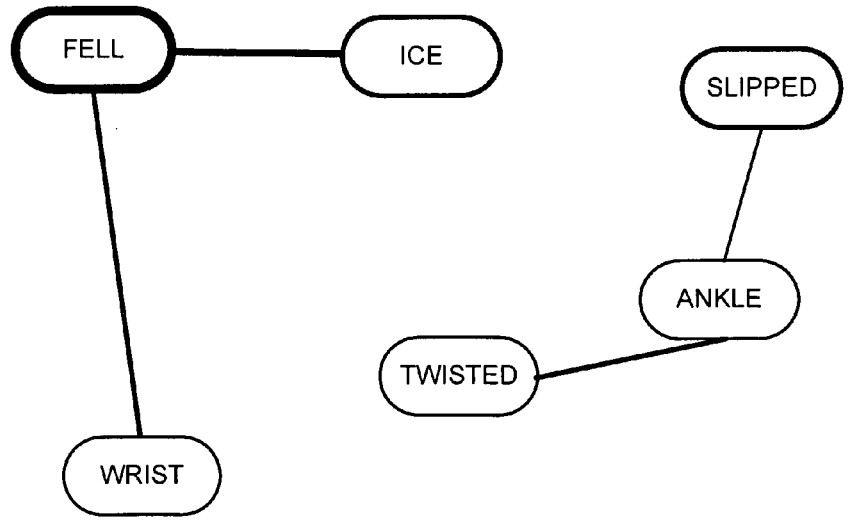
FIG. 4 illustrates an exemplary display of change data showing words having significant changes and related information.
FIG. 5 illustrates an exemplary graphical view including nodes and edges.

Next, change data displaying component 214 may cause change data to be displayed (act 310). FIG. 4 illustrates an exemplary display of change data, which may include one or more words having significant change amounts, a corresponding score or magnitude of change, which in some implementations may be scaled to be a value between a first value and a second value, such as, for example, 1 and 10, or any other values, and names of files or text documents that include each corresponding word. FIG. 4 is only exemplary. Other implementations may display additional or different information related to changes.

Information with respect to files that include words having significant changes may be provided to visual graphing component 216 (act 312), which may present a graph, such as an exemplary graph as shown in FIG. 5 (act 314). In FIG. 5, a score ranking or a score range may be indicated by a thickness of a line making up a node and by a thickness of a line of an edge. Thicker lines may indicate a higher score ranking or score range. Alternatively, thinner lines may indicate a higher score ranking or score range. Other implementation may employ other visual techniques to indicate score ranking or score range, such as, for example, color, size, typography (font, boldness, slant) of displayed text, or other techniques.

Figure 6:
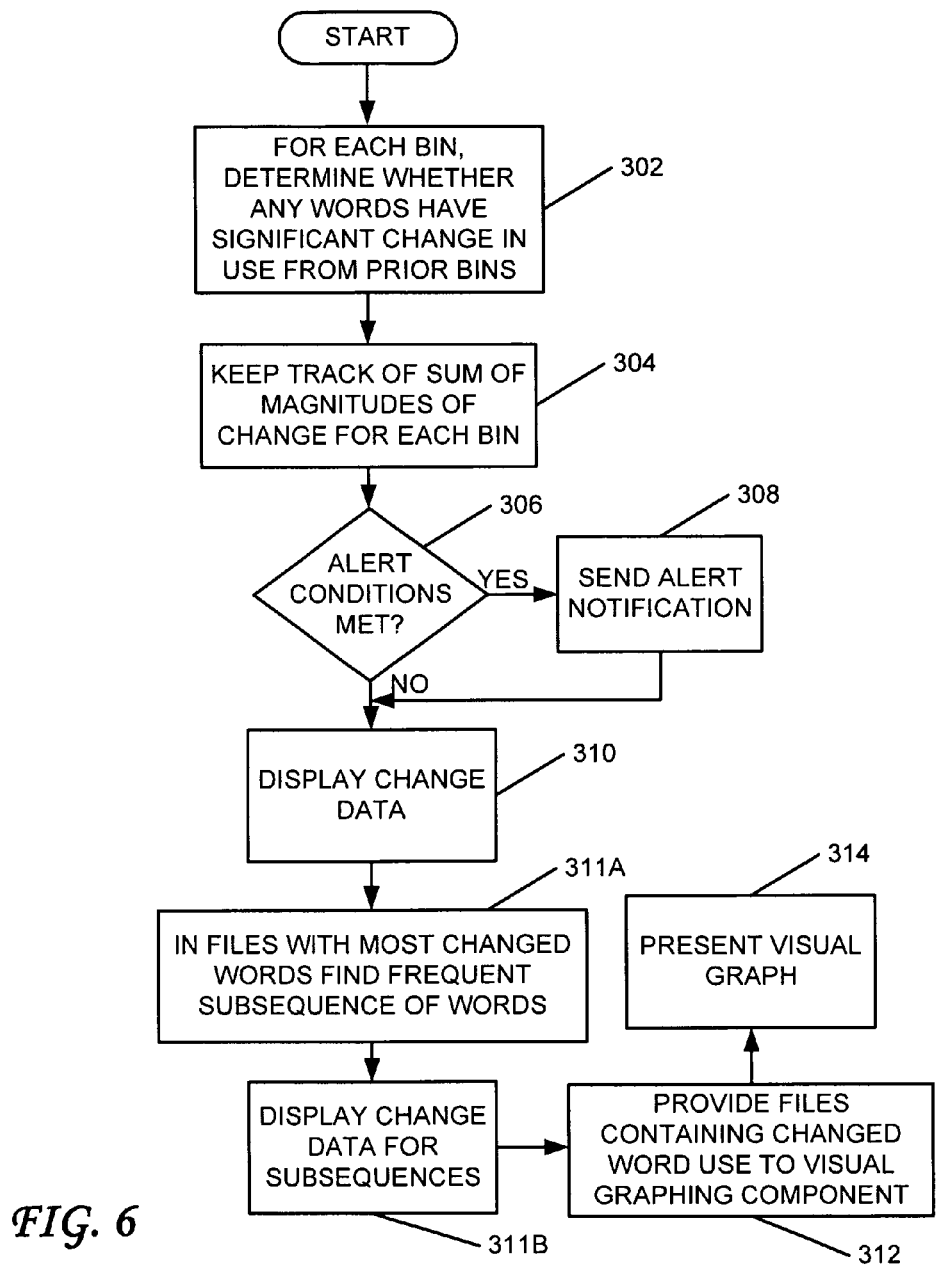
FIG. 6 is a flowchart that illustrates a second exemplary process that may be employed in implementations consistent with the principles of the invention.

FIG. 6 is a flowchart that illustrates another exemplary process that may be employed in other implementations consistent with the principles of the invention. The flowchart of FIG. 6 differs from that of FIG. 3 by the addition of acts 311A and 311B.

According to act 311A, files that include words having the largest magnitude of changes may be analyzed to determine frequently occurring subsequences of words. A subsequence of words may be a group of words that occur in a particular order, but may or may not be contiguous to one another. A magnitude of change for the subsequence of words may be computed in a manner similar to the manner in which the magnitude of change for words is computed. Similarly, subsequences of words may have assigned weights indicating a level of importance of the corresponding subsequences. The weights may be configurable. Change data with respect to the subsequences of words may be displayed in a manner similar to the displayed change data for words shown in FIG. 4. Similarly, the magnitudes of change for subsequences may be scaled to be values between a first and second value, as discussed previously with respect to the magnitudes of change for words.

In other implementations, in act 311A, change point detecting component 212 may find frequently occurring phrases or co-occurrences of words within text documents including the most changed words and, in act 311B, change point displaying component 214 may present a display, similar to that of FIG. 4, which provides change data with respect to the frequently occurring phrases or co-occurrences of words.

Interactive View

Implementations consistent with the principles of the invention may include an interactive graphical view. In such an implementation, a graph similar to the graph of FIG. 5 may be displayed. When a user places a pointing device, such as, for example, a mouse, a stylus, an electronic pen, or other pointing device, over a node or an edge, statistics concerning the particular node or the particular edge may appear superimposed over a portion of the graphical view. For example, when the user places the pointing device over a node, various statistics concerning the node may be displayed, such as a word or words of the node, frequency of occurrence in the corpus, a score value for the node, etc. When the user places the pointing device over the particular edge, various statistics concerning the edge may be displayed, such as words of nodes connected by the edge, frequency of occurrence within a corpus of the co-occurrence of words from the connected nodes, a number of occurrences of the co-occurrence within the corpus of the words from the connected nodes, etc. The above description of the type of data and statistics displayed when the pointing device is placed over a node or edge are exemplary. In other implementations, other types of data or statistics may be displayed in addition to or instead of the exemplary types of data and statistics mentioned.

In some implementations, a user may select, using the pointing device, a node or edge displayed in the graphic view by for example, clicking on the node or edge with a computer mouse, touching the node or edge with a stylus or electronic pen, or by other means. When the node or edge is selected, detailed information about the node or edge may be displayed. The detailed information may include, for example, the exemplary data mentioned above and/or other data including information from text documents containing words or terms included in a selected node or information regarding a relationship indicated by a selected edge.

Implementations consistent with the principles of the invention may permit a user to indicate a desire to view statistical data with respect to certain words, In such implementations, a user may select, using a pointing device, multiple nodes that include words of interest. The user may select the multiple nodes by, for example, pressing a control-key on a keyboard while selecting the nodes with the pointing device. Other means of selecting multiple nodes may be used in other implementations. As a result of selecting the multiple nodes, a display similar to that shown in FIG. 7 may be presented showing words corresponding to the selected nodes and information about the words, such as, for example, a percentage of documents in which a corresponding word appears.

Similarly, implementations consistent with the principles of the invention may permit a user to indicate a desire to view statistical data with respect to a co-occurrence of words. In such implementations, a user may select, using a pointing device, multiple edges that represent a relationship of interest between two nodes. The user may select the multiple edges by, for example, pressing a control-key on a keyboard while selecting the edges with the pointing device. Other means of selecting multiple edges may be used in other implementations. As a result of selecting the multiple edges, a display similar to that shown in FIG. 8 may be presented showing word groups represented by the selected edges and data pertaining to each of the word groups such as, for example, a percentage of documents having a co-occurrence of the words of each of the group of words.

Monitoring

The previously-described implementations may be used retrospectively to determine word changes within documents that have already been received. However, implementations consistent with the principles of the invention may also be used to monitor text documents or words as they arrive. In such implementations, words are stored as they arrive over time. The current bin may be, in effect, a sliding window of X words, where the current bin size is X, or the current bin may be all words received over a predefined time period, such as, for example, a day, a week, a month, or any other suitable time period. The last received word may be treated as the last word of the current bin. Thus, for example, if the current bin is to hold 24 hours of received words, then the current bin ends with the last word received and begins with the first word received during a time period that begins 24 hours earlier than the last received word. In other respects, monitoring implementations may be the same as the previously-described implementations.

CONCLUSION

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules, include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules or components may be located in both local and remote memory storage devices.

Although the above description may contain specific details, they should not be construed as limiting the claims in anyway. Other configurations of the described embodiments of the invention are part of the scope of this invention. For example, hardwired logic may be used in implementations instead of processors, or one or more application specific integrated circuits (ASICs) may be used in implementations consistent with the principles of the invention. Further, implementations consistent with the principles of the invention may have more or fewer acts than as described, or may implement acts in a different order than as shown. Accordingly, the appended claims and their legal equivalents should only define the invention, rather than any specific examples given.

We claim as our invention:

1. A method comprising:
    identifying, via a processor, that a change in a word use has occurred across a plurality of bins, wherein each respective bin of the plurality of bins is defined by a time stamp of each word in each respective bin;
    tracking a sum of magnitudes of the change for each respective bin;
    when an alert condition exists based on the sum of magnitudes, sending an alert notification; and
    presenting change data which is based on a change point corresponding to the sum of magnitudes at a time frame when the alert condition is determined to have initiated.

2. The method of claim 1, wherein assigning the score further comprises:
    calculating a score for the change based on a relative frequency of occurrence of the word with respect to other words and a weight assigned to the relative frequency of occurrence.

3. The method of claim 1, further comprising:
    determining whether a significant change in a use of a co-occurrence of words occurs in the plurality of bins, wherein
    the change data presented is further based on a change point corresponding to the significant change in the use of the co-occurrence of words.

4. The method of claim 1, wherein:
    the change data comprises a graphic view having a node comprising the word and edges joining the node to a second node associated with the change and the word; and
    the method further comprises:
        providing to a graphing component the plurality of bins and a time range based on the sum of magnitudes; and
        using the graphing component to present the change data.

5. The method of claim 1, further comprising:
    providing more detailed change data when a user makes a selection on a portion of the change data, wherein the more detailed change data pertains to the portion of the change data selected by the user.

6. The method of claim 1, further comprising:
    determining whether a group of contiguous words is a meaningful lexical unit; and
    when the meaningful lexical unit is found, treating the meaningful lexical unit as a single word.

7. The method of claim 1, further comprising:
    mapping the word to a synonym.

8. A system comprising:
    a processor; and
    a computer-readable storage medium having instructions stored which, when executed by the processor, cause the processor to perform a method comprising:
        identifying, via a processor, that a change in a word use has occurred across a plurality of bins, wherein each respective bin of the plurality of bins is defined by a time stamp of each word in each respective bin;
        tracking a sum of magnitudes of the change for each respective bin;
        when an alert condition exists based on the sum of magnitudes, sending an alert notification; and
        presenting change data which is based on a change point corresponding to the sum of magnitudes at a time frame when the alert condition is determined to have initiated.

9. A computer-readable storage device having instructions stored which, when executed by a processor, result in the processor performing operations comprising:
- identifying, via a processor, that a change in a word use has occurred across a plurality of bins, wherein each respective bin of the plurality of bins is defined by a time stamp of each word in each respective bin;
- tracking a sum of magnitudes of the change for each respective bin;
- when an alert condition exists based on the sum of magnitudes, sending an alert notification; and
- presenting change data which is based on a change point corresponding to the sum of magnitudes at a time frame when the alert condition is determined to have initiated.

10. The computer-readable storage device of claim 9, wherein assigning of the score further comprises:
- calculating a score for the change based on a relative frequency of occurrence of the word with respect to other words and a weight assigned to each relative frequency of occurrence.

11. The computer-readable storage device of claim 9, the computer-readable storage device having additional instructions stored which result in the operations further comprising:
- determining whether a significant change in a use of a co-occurrence of words occurs in the plurality of bins, wherein
- the change data presented is further based on a change point corresponding to the significant change in the use of the co-occurrence of words.

12. The computer-readable storage device of claim 9, wherein:
- the change data comprises a graphic view having a node comprising the word and edges joining the node to a second node associated with the word and the change; and
- the computer-readable storage device has additional instructions stored which result in the operations further comprising:
  - providing to a graphing component the plurality of bins and a time range based on the change point; and
  - using the graphing component to present the change data.

13. The computer-readable storage device of claim 9, the computer-readable storage device having additional instructions stored which result in the operations further comprising:
- preprocessing the plurality of bins such that words of the plurality of bins are in a standard form.

14. The computer-readable storage device of claim 9, the computer-readable storage device having additional instructions stored which result in the operations further comprising:
- determining whether a group of contiguous words is a meaningful lexical unit; and
- when the meaningful lexical unit is determined, treating the meaningful lexical unit as a single word.

15. The computer-readable storage device of claim 9, the computer-readable storage device having additional instructions stored which result in the operations further comprising:
- mapping the word to a synonym.

16. The computer-readable storage device of claim 9, the computer-readable storage device having additional instructions stored which result in the operations further comprising:
- providing more detailed change data when a user makes a selection on a portion of the change data, wherein the more detailed change data pertains to the portion of the change data selected by the user.

17. An system comprising:
- a processor;
- an output device; and
- a computer-readable storage medium having instructions stored which, when executed by the processor, cause the processor to perform operations comprising:
  - identifying, via a processor, that a change in a word use has occurred across a plurality of bins, wherein each respective bin of the plurality of bins is defined by a time stamp of each word in each respective bin;
  - tracking a sum of magnitudes of the change for each respective bin;
  - when an alert condition exists based on the sum of magnitudes, sending an alert notification; and
  - presenting change data which is based on a change point corresponding to the sum of magnitudes at a time frame when the alert condition is determined to have initiated.

18. The system of claim 17, the computer-readable storage medium having additional instructions stored which result in the operations further comprising calculating the change based on a relative frequency of occurrence of the word with respect to other words and a weight assigned to the relative frequency of occurrence.

19. The system of claim 17, the computer-readable storage medium having additional instructions stored which result in the method further comprising:
- determining whether a significant change in a use of a co-occurrence of words occurs in the plurality of bins, wherein
- the data presented is further based on a change point corresponding to the significant change in the use of the co-occurrence of words.

20. The system of claim 17, wherein:
- the data comprises a graphic view having a node comprising the word and edges joining the node to a second node associated with the change and the word; and
- the computer-readable storage medium having additional instructions stored which result in the operations further comprising:
  - presenting the change data based on the plurality of bins and a time range based on a significant change point.

21. The system of claim 17, the computer-readable storage medium having additional instructions stored which result in the operations further comprising:
- determining whether a group of contiguous words is a meaningful lexical unit; and
- when the meaningful lexical unit is determined, treating the meaningful lexical unit as a single word.

22. The system of claim 17, the computer-readable storage medium having additional instructions stored which result in the operations further comprising:
- provide more detailed data when a user makes a selection on a portion of the change data, wherein the more detailed data pertains to the portion of the data selected by the user.

* * * * *